United States Patent
Sarab et al.

(10) Patent No.: US 9,953,175 B2
(45) Date of Patent: Apr. 24, 2018

(54) SYSTEMS AND METHODS FOR DETECTING SUBSTITUTION OF HIGH-VALUE ELECTRONIC DOCUMENTS

(75) Inventors: Greg N. Sarab, Half Moon Bay, CA (US); Alexander J. Fanti, Reisterstown, MD (US)

(73) Assignee: EXTEGRITY, INC., Half Moon Bay, CA (US)

( * ) Notice: Subject to any disclaimer, the term of this patent is extended or adjusted under 35 U.S.C. 154(b) by 0 days.

(21) Appl. No.: 13/211,291

(22) Filed: Aug. 16, 2011

(65) Prior Publication Data

US 2012/0066771 A1   Mar. 15, 2012

Related U.S. Application Data

(60) Provisional application No. 61/373,874, filed on Aug. 16, 2010.

(51) Int. Cl.
| | | |
|---|---|---|
| *G06F 21/64* | (2013.01) | |
| *G09B 7/00* | (2006.01) | |
| *G09B 7/02* | (2006.01) | |
| *G06F 21/62* | (2013.01) | |

(52) U.S. Cl.
CPC ........ *G06F 21/6209* (2013.01); *G06F 21/645* (2013.01); *G09B 7/00* (2013.01); *G09B 7/02* (2013.01); *G06F 2221/2111* (2013.01); *G06F 2221/2137* (2013.01)

(58) Field of Classification Search
CPC ........ G06F 21/60; G06F 21/64; G06F 21/645; G06F 2221/2111; G06F 2221/2149; H04L 9/32; H04L 9/0866; H04L 9/3236; G09B 7/00; G09B 7/02

USPC .................................. 705/50–51; 726/26–28
See application file for complete search history.

(56) References Cited

U.S. PATENT DOCUMENTS

| | | | | |
|---|---|---|---|---|
| 3,722,111 A | * | 3/1973 | Georges ............. | G06K 17/0032 235/454 |
| 5,293,422 A | | 3/1994 | Loiacono | |
| 5,915,973 A | * | 6/1999 | Hoehn-Saric ...... | G07C 9/00158 434/118 |
| 5,947,747 A | * | 9/1999 | Walker ..................... | G09B 7/02 380/251 |
| 6,112,049 A | * | 8/2000 | Sonnenfeld .............. | G09B 5/14 434/118 |
| 6,418,298 B1 | * | 7/2002 | Sonnenfeld .............. | G09B 5/14 434/118 |
| 6,681,098 B2 | * | 1/2004 | Pfenninger .............. | G09B 5/00 434/336 |
| 6,963,858 B2 | * | 11/2005 | Wang ...................... | G06F 21/10 705/51 |

(Continued)

FOREIGN PATENT DOCUMENTS

| | | |
|---|---|---|
| WO | WO 97/42615 | 11/1997 |
| WO | 99/36848 | 7/1999 |

OTHER PUBLICATIONS

EP European Search Report dated Apr. 14, 2014 issued for EP Patent Application No. 11818700.4.

*Primary Examiner* — Tae Kim
(74) *Attorney, Agent, or Firm* — Jeffery D. Frazier

(57) ABSTRACT

Embodiments are described of systems and methods for prevention, detection, mitigation of risk, and such, of unauthorized manipulation, e.g., substitution, of high-value data files (including electronic document files).

16 Claims, 3 Drawing Sheets

(56) References Cited

U.S. PATENT DOCUMENTS

| | | | |
|---|---|---|---|
| 7,069,586 B1* | 6/2006 | Winneg | G06F 21/52 713/189 |
| 7,165,269 B2* | 1/2007 | Winneg | G06F 21/52 713/189 |
| 7,243,236 B1* | 7/2007 | Sibert | G06F 21/51 380/255 |
| 7,330,887 B1* | 2/2008 | Dharmadhikari | G06F 11/3419 709/224 |
| D587,719 S | 3/2009 | Tate et al. | |
| 7,784,045 B2* | 8/2010 | Bowers | G06F 11/3684 717/124 |
| 7,828,551 B2* | 11/2010 | Bowers | G06F 11/3684 434/118 |
| 7,831,195 B2* | 11/2010 | Borchers | G09B 7/00 271/278 |
| 8,321,928 B2* | 11/2012 | Winneg | G06F 21/52 709/229 |
| 8,892,895 B1* | 11/2014 | Chesley | H04L 9/32 434/322 |
| 9,552,738 B2* | 1/2017 | Cano | G09B 7/00 |
| 2001/0031457 A1* | 10/2001 | Pfenninger et al. | 434/350 |
| 2002/0013519 A1* | 1/2002 | Adams | G06F 19/322 600/300 |
| 2002/0078139 A1* | 6/2002 | Dutta | G09B 7/02 709/203 |
| 2002/0113986 A1* | 8/2002 | MacDonald | G06K 15/00 358/1.12 |
| 2003/0087223 A1* | 5/2003 | Walker | G09B 7/02 434/353 |
| 2003/0135466 A1* | 7/2003 | Wang | G06F 21/10 705/51 |
| 2004/0091847 A1* | 5/2004 | Creamer | G09B 7/02 434/353 |
| 2004/0106088 A1* | 6/2004 | Driscoll | G09B 7/02 434/118 |
| 2004/0216010 A1* | 10/2004 | Muller | G06F 21/64 714/38.1 |
| 2004/0221013 A1* | 11/2004 | Timbadia | H04L 43/00 709/206 |
| 2004/0229199 A1* | 11/2004 | Ashley | G09B 7/00 434/323 |
| 2004/0259067 A1* | 12/2004 | Cody | G06F 3/03545 434/323 |
| 2005/0095571 A1* | 5/2005 | Miller | G09B 7/02 434/350 |
| 2005/0269406 A1 | 12/2005 | Neff | |
| 2006/0035203 A1* | 2/2006 | Berrent | G09B 3/02 434/326 |
| 2006/0174338 A1* | 8/2006 | Winneg | G06F 21/52 726/16 |
| 2007/0117082 A1* | 5/2007 | Winneg | G09B 7/00 434/350 |
| 2008/0140865 A1* | 6/2008 | Borchers | G09B 7/00 710/1 |
| 2008/0281682 A1* | 11/2008 | Euchner | G07C 13/00 705/12 |
| 2008/0285818 A1* | 11/2008 | Warren | G09B 7/02 382/124 |
| 2008/0293033 A1* | 11/2008 | Scicchitano | G07C 9/00158 434/350 |
| 2010/0017615 A1* | 1/2010 | Boesgaard Sorensen | G06F 21/55 713/176 |
| 2013/0198833 A1* | 8/2013 | Winneg | G06F 21/52 726/16 |
| 2013/0266926 A1* | 10/2013 | Cano | G09B 7/00 434/362 |
| 2014/0072946 A1* | 3/2014 | Scicchitano | G07C 9/00158 434/350 |
| 2014/0075545 A1* | 3/2014 | Winneg | G06F 21/52 726/16 |

\* cited by examiner

SYSTEMS AND METHODS FOR DETECTING SUBSTITUTION OF HIGH-VALUE ELECTRONIC DOCUMENTS

RELATED APPLICATION

The present application claims priority to U.S. provisional application No. 61/373,874, filed Aug. 16, 2010; incorporated herein by reference.

FIELD OF THE INVENTION

The present teachings relate to the prevention, detection, and such, of unauthorized manipulation (e.g., substitution) of high-value data files, including electronic documents.

BACKGROUND OF THE INVENTION

Situations or events occur where high-value data files are generated by numerous users for submittal to the event authority, and where it is imperative to assure the files are original as created during the authorized time period and location of the event. In various embodiments, such a situation or event may be for example, without limitation, a test or exam, such as a computer-based academic or professional exam (e.g., state bar exam, final exam for a college course, etc.), or the like, wherein the examinee provides answers or inputs which create or populate a data file in one or more memory devices of a computer (e.g., a PC, such as a laptop PC). Submittal of data files may occur at any time following the creation of the files, thus a highly secure method for prevention or detection of substitution of the files is needed.

SUMMARY OF THE INVENTION

An exemplary and non-limiting summary of various embodiments is set forth next.

The present teachings provide, among other things, various embodiments of systems and methods for prevention, detection, mitigation of risk, and such, of unauthorized manipulation, e.g., substitution, of high-value data files (including electronic documents).

Various aspects of the present teachings relate, among other things, to a method for detecting substitution of information by an untrusted agent. According to various embodiments, a method for detecting substitution of information by an untrusted agent can comprise: (i) providing secured electronic document creation software for use by an untrusted agent for creating informational content within a primary information carrier during a controlled time period and in a controlled location; (ii) embedding identifying information into the primary information carrier; (iii) protecting the informational content and identifying information within the primary information carrier by encryption; (iv) preventing editing of the informational content within the primary information carrier after the controlled time period and outside the controlled location; (v) reporting the identifying information to the untrusted agent at the end of the controlled time period and before the untrusted agent exits the controlled location, with a direction to the untrusted agent to record the identifying information to a secondary information carrier; (vi) delivering the primary information carrier, by the untrusted agent via a primary information channel, to an authority, and delivering the secondary information carrier, by the untrusted agent via a secondary information channel to the authority, before the untrusted agent exits the controlled location; (vii) comparing the identifying information contained in the secondary information carrier with the corresponding identifying information embedded in the primary information carrier; and, (viii) using the results of the comparing step to determine whether substitution of the primary information carrier occurred.

According to various embodiments, the secured electronic document creation software is configured to run on a computing apparatus, such as a personal computer, laptop computer, or the like.

In various embodiments, the primary information carrier comprises an electronic document.

In a variety of embodiments, the electronic document comprises an examination (e.g., a bar examination).

According to various embodiments, the untrusted agent comprises an examinee.

In a variety of embodiments, the authority comprises an examiner.

In accordance with various embodiments, the secondary information carrier comprises a paper form. In a variety of embodiments, the paper form includes at least one perforation.

In a variety of embodiments, the identifying information contained in the secondary information carrier and the identifying information embedded in the primary information carrier each comprises a string of alphanumeric characters.

Further aspects of the present teachings relate to systems and methods for detecting substitution of information by an untrusted agent. In various embodiments, a computer-readable storage medium is provided with an executable program stored thereon, wherein the program can instruct a microprocessor to perform the following steps: (i) providing a word processing function whereby an untrusted agent (e.g., examinee) can create informational content in an electronic document; (ii) blocking access to other materials and applications on a computer on which the program is running; (iii) monitoring operations and actions performed on the computer; (iv) logging computer activity and time data; (v) creating identifying information; (vi) embedding the identifying information into the electronic document; (vii) encrypting the electronic document; (viii) reporting the identifying information at a selected moment to the untrusted agent; (ix) decrypting the electronic document; and, (x) outputting the identifying information for display.

A variety of embodiments include instructions to perform the step of copying the electronic document as a file to a memory device (e.g., flash memory), as for manual delivery to an authority (e.g., an examiner); or electronically transmitting the document via a network, e.g., using protocols such as FTP, HTTP, HTTP POST, or email.

Various embodiments include instructions to perform the step of anonymously identifying the untrusted agent (e.g., examinee).

Additional aspects of the present teachings relate to methods for detecting substitution of information by an untrusted agent. In various embodiments, a method comprises: (i) providing secured electronic document creation software for use by an untrusted agent for creating informational content within a primary information carrier during a controlled time period and in a controlled location; (ii) a step for embedding identifying information into the primary information carrier; (iii) a step for protecting the informational content and identifying information within the primary information carrier by encryption; (iv) a step for preventing editing of the informational content within the primary information carrier after the controlled time period and outside the controlled location; (v) a step for reporting the identifying information to the untrusted agent at the end of the controlled time period and before the untrusted agent exits the controlled location, with a direction to the untrusted agent to record the identifying information to a secondary information carrier; (vi) a step for delivering the primary information carrier, by the untrusted agent via a primary information channel, to an authority, and delivering the secondary information carrier, by the untrusted agent via a secondary information channel to the authority, before the untrusted agent exits the controlled location; and, (vii) a step for comparing the identifying information contained in the secondary information carrier with the corresponding identifying information embedded in the primary information carrier; whereby the results of the comparing step are used to determine whether substitution of the primary information carrier occurred.

According to various embodiments, the primary information carrier comprises an electronic document.

In a variety of embodiments, the electronic document comprises an examination (e.g., a bar examination).

In various embodiments, the untrusted agent comprises an examinee.

According to a variety of embodiments, the authority comprises an examiner.

In various embodiments, the secondary information carrier comprises a paper form.

According to a variety of embodiments, the paper form comprises at least one perforation.

In a variety of embodiments, the identifying information contained in the secondary information carrier and the identifying information embedded in the primary information carrier each comprises a string of alphanumeric characters.

BRIEF DESCRIPTION OF THE DRAWINGS

Other systems, methods, features and advantages of the present teachings will be or will become further apparent to one with skill in the art upon examination of the following figures and description.

DETAILED DESCRIPTION

Various aspects of present teachings relate to processes for providing reasonable certainty and proof that a data file, e.g., an electronic document, purported to have been created on a computer in a specific location during a specific time interval was actually so created.

As described above, in certain situations, it is useful to know a document has been created within a secured environment, for example: an essay written as an answer to an exam. Commonly, for an exam, an authority such as an examiner will wish to be certain all answers were written during a specific time period in a room monitored to restrict the arrival/departure and behavior of examinees. In times past, when essays were written by hand, physical collection of documents at the end of the exam session provided certainty the documents were created in the exam room during the exam time. In some exams today, where examinees use a computer to create electronic documents in the exam room during exam time, examiners may be able to use a similar method to ascertain when the document was written, chiefly, by printing the collected documents shortly after the end of exam time.

Now, in certain other situations, the electronic documents cannot be collected and printed or otherwise produced quickly enough to ascertain with adequate assurance when and where it was written. In these situations, it is strongly desirable nonetheless to have such assurance, which the present teachings address.

A general way of describing the situation is to say that a document created by a trusted means within the secured environment must be transferred to its destination by an untrusted agent through an untrusted communication channel. The present teachings ensure that in spite of the untrusted nature of both the agent and the communication channel that the document received at the destination is a true, intact and uncorrupted copy of the original. An example is to say that an exam essay written or validated by using trusted software in a controlled exam room during a controlled exam time must be transferred by the examinee to the examiner through the use of an uncontrolled electronic delivery method. The present teachings give the examiner assurance the document received is the one created in the controlled exam room during the controlled exam time.

Figure 1:
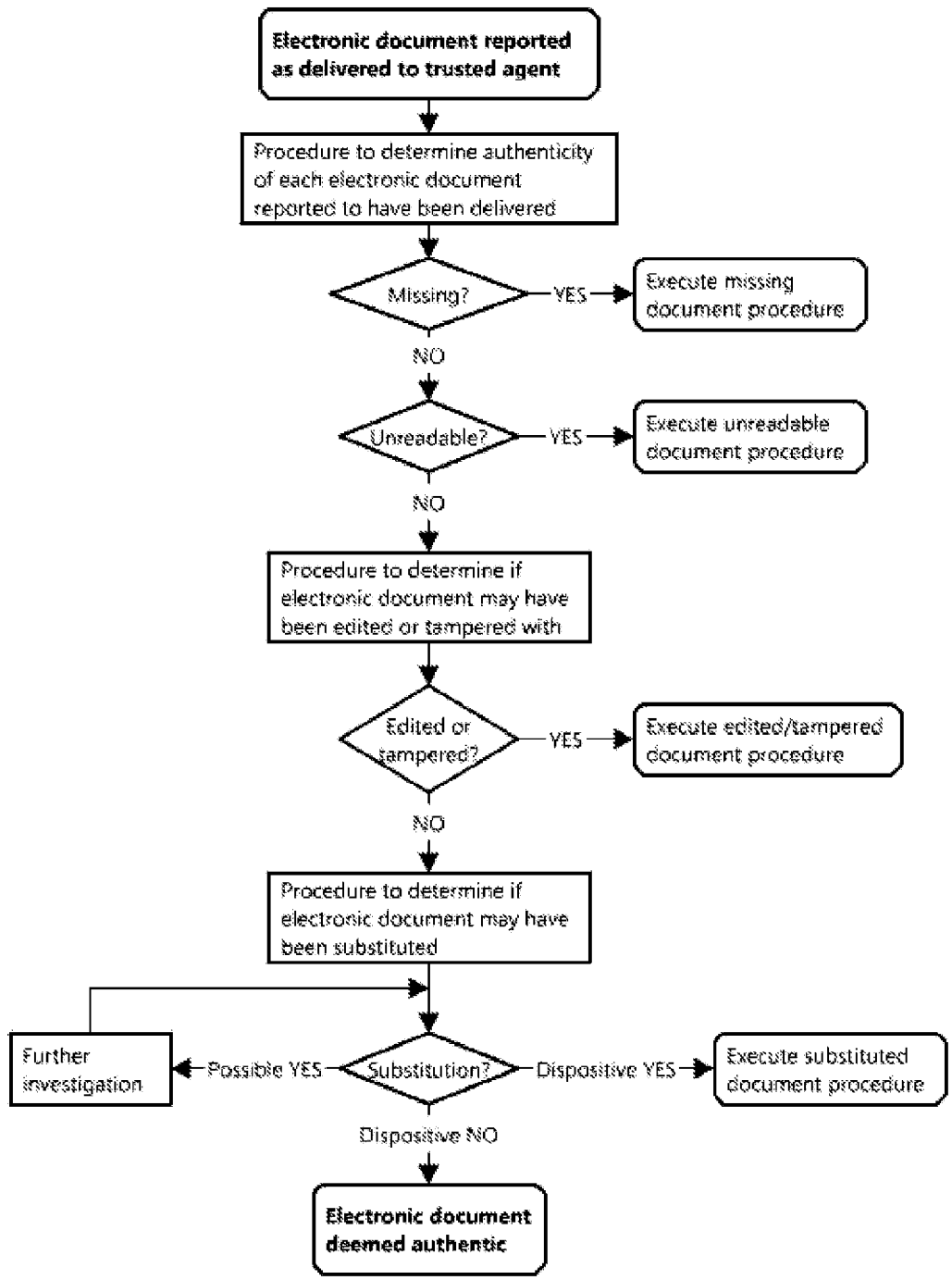
FIG. 1 depicts, in flow chart format, possible negative outcomes of electronic document delivery when the documents are inspected for status for several criteria (file missing, unreadable, edited or tampered with, substituted), according to various embodiments of the present teachings. The present teachings address, among other things, the fourth possible negative outcome (substitution).

Four possible negative outcomes of document delivery are identified—the document is: 1) missing; 2) unreadable; 3) edited or tampered with; or 4) substituted. FIG. 1 depicts, in flow chart format, possible negative outcomes of electronic document delivery when the documents are inspected for status for several criteria (file missing, unreadable, edited or tampered with, substituted), according to various embodiments of the present teachings. The present teachings address, among other things, the fourth possible negative outcome (substitution). Missing documents and unreadable documents are easy to detect, whereas trusted means of creating or validating the document can use encryption, data hash or other method to assure editing has not occurred. However, to protect against the agent or channel substituting a bogus document that is intact, uncorrupted, and created by the same trusted means, a method of detecting attempted substitution is desirable.

As used herein, the terms "electronic document" or "document" refer to what holds what the examinee is typing, and are encompassed by the general term "carrier". The term "carrier" can further encompass, without limitation, a carrier wave or signal, a paper form, a punch card, a clay tablet, etc.

As used herein, the term "channel" refers to the mechanism, method or process by which the carrier is transmitted to the authority. In a variety of embodiments, it can be useful to conceptualize a channel as a conduit by which a carrier, such as an electronic document, is transmitted or delivered. More particularly, in various embodiments, everything between when an untrusted agent has a document and when the document reaches its destination (e.g., an authority, such as an examiner) can comprise a channel. For example, the channel can be conceptualized as everything that happens in the interstice between when an examinee initiates the process of getting an electronic document to an authority and when the document is received or accepted by the authority, where the details of that interstitial activity may vary. It is to be noted that there can be a plurality of channels, e.g., "primary", "secondary", "tertiary", etc. In this regard, according to various embodiments, primary and secondary channels can be provided which can be separate and distinct with at least one of the channels (e.g., the secondary channel) being trusted in nature.

As used herein, the term "agent" refers to an entity or party, where a "trusted agent" is either the authority itself, or an agent the authority expressly designates and trusts, and is responsible for the secured environment (or secured location) wherein the carrier is to be produced, and an "untrusted agent" is a person in the secured environment, under the authority's control but expressly not trusted by the authority, who is the creator of a carrier, such as an electronic document, which is the subject of the method.

The present teachings provide for the creation of a second "agent" and a second "channel" and use them to transfer trustworthy information about the document to the destination. In accordance with various embodiments, the second agent and/or channel may be separate from the primary agent and/or channel. The information transferred by the second agent/channel can be anything from a very short alpha-numeric sequence all the way up to a duplicate of the document, depending on the situation, so long as it includes enough information to verify the document's authenticity.

The degree of assurance of the integrity of documents depends on the configuration of the secondary (or tertiary, etc.) agent/channel and the information transferred, and may be impacted by factors such as deliberate effort or collusion to deceive the destination agent, or random chance resulting in identical inaccurate information about the document. The present teachings provide systems and methods for protecting against a deliberate effort(s) to deceive and minimizing exposure to random chance.

An exemplary embodiment, in accordance with the present teachings, can be described with reference to the field of secured essay examinations. In a typical exam, examinees create documents in a secured environment under the supervision of an authority such as an examiner (trusted agent) in both: a) a specific secured location where access and activity are controlled, and b) a specific time interval.

In current practice, examinees create their documents, essentially essays answering the exam question, within a computer software application, hereinafter referred to as "exam software", designed to facilitate exam creation and administration. In this example, the exam software is generally, and among other provisions, comprised of a word processing interface with features for: frequent saving and backup of exam documents; blocking access to disallowed materials on the computer; encrypting the work; administrative functions such as anonymously identifying the examinee; and tools for transmission of documents to the examiner.

The creation of electronic documents by the systems and methods of the present teachings can, in various embodiments, include these characteristics:

A. Due to the use of a specific method of data encryption, the electronic documents can only be created, modified, edited, encrypted, inspected, or similarly acted upon by software created for the purpose.
B. Following creation of a document, due to the designated operation of the software used for the purpose, the contents cannot be acted upon or modified by the user who created the file by use of the software.
C. The contents of the document cannot be modified beyond what the software created for the purpose will allow without causing the document to become unreadable by the software.
D. Depending on the interface design, the software can be used to embed any data into the file at any time, and the data cannot be inspected or modified unless the software allows it.

In this scenario, the exam software is a trusted source and renders the trusted document, which then must be transmitted to the examiner by the examinee (untrusted agent) using an electronic communication method (untrusted channel). The most common methods for transmitting the document can include, but are in no way limited to, copying the file to a flash memory device for manual delivery to the examiner, or electronic transmittal of the document using industry-standard methods such as FTP, HTTP, HTTP POST, or email.

Figure 2:
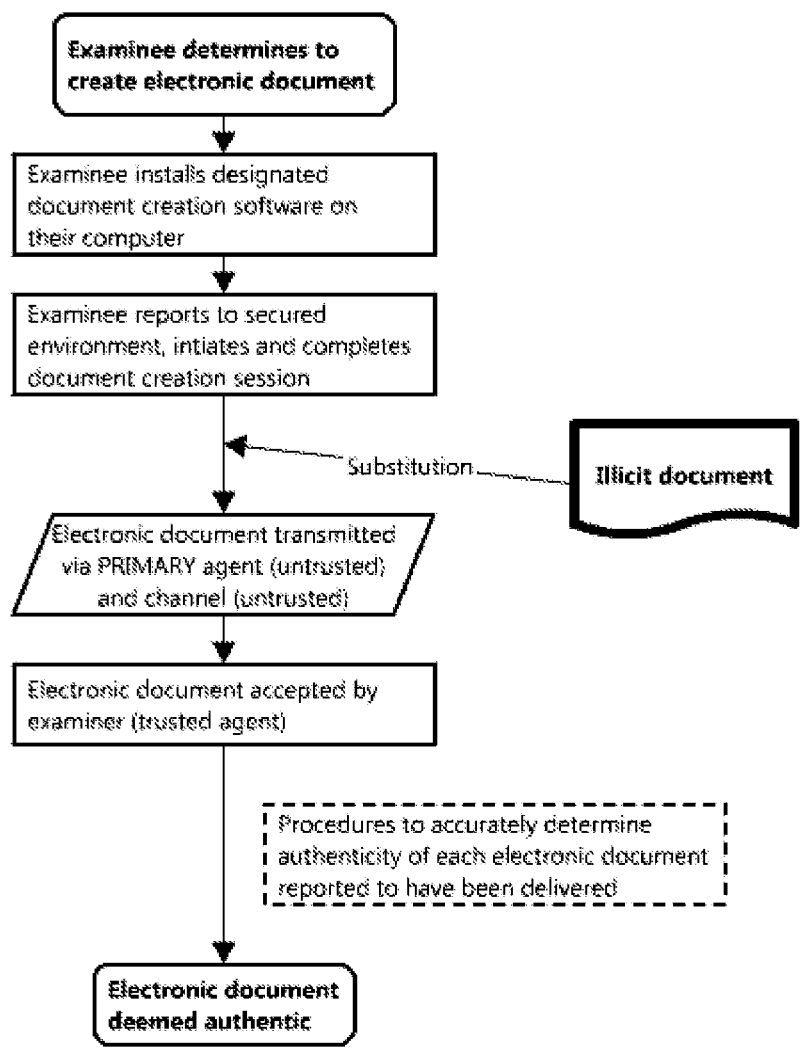
FIG. 2 shows, in flow chart format, that somewhere between acceptance of an electronic document and deeming it authentic, there needs to be a step to determine its authenticity, according to various embodiments of the present teachings.

Transmission of the document to an authority such as an examiner is a necessary step, but is vulnerable to cheating if the examinee substitutes an illicit document undetected. FIG. 2 shows, in flow chart format, that somewhere between acceptance of an electronic document and deeming it authentic, there needs to be a step to determine its authenticity, according to various embodiments of the present teachings. The invention provides a reliable method to ensure the document received is in fact the document created in the secured exam room during the exam. It does so by requiring and enabling transmission of an additional item of trustworthy information about the document, which may readily be checked against the original document.

In the exemplary embodiment, this is accomplished as follows: 1) the exam software creates a new item of information about the document in the form of a short numeric "confirmation code", which is 2) recorded into the secondary channel by written notation on a specially designed, designated and handled paper form, which is 3) transmitted by the examinee, who serves as both secondary and primary agent, whereupon 4) the form is inspected, validated, and a receipt is created and returned to the examinee.

A. The confirmation code is created by the exam software and embedded into the encrypted document. Once the code has been embedded in the encrypted document it cannot, by virtue of the encryption, be altered. The code is revealed to the examinee at the completion of each exam session at the moment the examinee confirms to the software their intention to end the session and deliver the document to the examiner. The examinee is directed to record it by handwriting the code into a specified location on a paper form that has been provided and then deliver the completed form to the examiner before leaving the secured environment. Display, recording and delivery of the code may be accomplished by a variety of means, and is not limited to this exemplary method. The code is available for inspection by the examiner using separate tools designed as part of the exam software system to decrypt and display desired information from the documents created by the software.

The confirmation code does not have to be globally unique, although it could be made so. The code merely has to be random enough that it cannot reasonably be reproduced during the time span between when the document was completed and when it is collected. This degree of randomness is expected to be tailored to the environment and processes where the system is typically used. In the exemplary embodiment, exam sessions typically last for three hours, essentially all documents are collected within 10 minutes of the end of the session, and a very small number of documents are collected over the next few days.

It is possible to describe the difficulties faced by a cheater attempting to subvert the invention by the substitution method. In order to effectively substitute a document with the same confirmation code embedded, it would be necessary to rewrite the entire exam, since the software is typically set to disallow the ability to insert large portions of pre-written text into the document. Further, most exams important enough to utilize exam software include complex, lengthy questions, whereas most examiners do not make the questions available outside the exam environment, nor are examinees in most cases allowed to remove even scratch paper where notes or details of the questions could have been recorded, making it extraordinarily difficult for a cheater to even reproduce the question accurately. Further, the exam would need to be rewritten over an identical length of time, three-hours in this exemplary embodiment, since the exam software system includes tools designed to flag documents written in time periods at variance with expected timings. Further, the text would have to be typed in at a natural-seeming pace across the three-hour period as opposed to all at once during the shorter time it might take to type the text continuously, since the system also includes the functionality to review progress over the entire document creation period. At this point, upon saving the illicit document, the confirmation code is shown. A four-digit confirmation code such as used by the exemplary system produces a one-in-ten-thousand (1:10,000) chance of receiving the right confirmation code in the illicit document. Failure to receive the needed code would require a cheater to try again, spreading the typing over three hours. It is easy to see the time and effort required to attempt to cheat in this manner is excessive.

In the exemplary embodiment, a four-digit number was selected as a reasonable balance between security and ease-of-use for examinees needing to transcribe the code as displayed onscreen. In other embodiments, it is anticipated the parameters might suggest a longer code is appropriate. A six-digit numeric code reduces the odds of repeating to one-in-a-million; a four alpha-character code, even removing potentially ambiguous characters such as "I", "O" and "L", reduces the odds to one-in-several-hundred-thousand. Key factors favoring a longer code would be if more time is allowed for delivery of the document and or if less time is provided for creation of the document. Unanticipated factors are possible; however, the code can be modified and extended flexibly to accommodate them. Additional methods may also be used to augment the security value of the confirmation codes, including for example, but not limited to: certain codes may be omitted from the list of acceptable codes so that their use is prima facie evidence of fabrication; non-standard characters may be used; the number of characters may be varied without notice; the code may be provided to the examinee in a machine-readable format or other format that may be recorded by other means, such as an image, sound, barcode, QR-code, visible color or light sequence, infrared pulse, radio-frequency emission, or the like to be scanned or captured using the examinee's cellphone, other device provided to the examinee, other device employed by the examiner; the code may be produced by another output device such as a computer printer, image projection device, or the like.

B. The secondary channel of information pertinent to the document is typically, in the exemplary embodiment, a simple paper form. Information collected includes, typically, but is in no way limited to: a) the examinee's identifying information, commonly an anonymous identification number, and b) a confirmation code. The information is typically written in multiple locations on either side of a perforation.

In various embodiments, recording of the identifying information and confirmation number can be accomplished, for example, without limitation, by having the user write the information on a physical document, by having the user create a machine readable code (e.g., a bubble grid such as used to record answers on standardized multiple choice exams, a punched card system, a character recognition system, etc.), by means of an infrared reading device, by means of a barcode reading device, by means of a wired or wireless computer network, or the like.

C. Transmission of the confirmation code by the secondary agent, in the exemplary embodiment, is accomplished by physical collection of a paper form. Simple procedural steps are typically enough to provide adequate assurance that examinees do not fail to deliver the paper form and that the form includes the necessary information. In the exemplary embodiment, trusted agents of the examiner are posted in the path of exit from the room, and are charged with inspecting, validating and collecting the paper forms from examinees.

In various embodiments, other methods of collecting the information are contemplated, and could include, but are in no way limited to: a barcode scanning; video recording of the transaction; electronic entry of the information at a collection station set up for the purpose; electronic transmission of the information using common wireless networking systems such as wifi or cellphones; etc.

D. The form is inspected, the notations validated, and the receipt is created when, in the exemplary embodiment, on satisfactory review of the notations, the agent marks the form, usually with a rubber stamp created for the purpose, being careful to make the mark across the line of perforation. The agent then tears the form along the perforation, handing one half to the examinee as a receipt and retaining the other half.

In various embodiments, validation of the identifying information and confirmation number could be accomplished, for example, without limitation, by, first, human inspection of a physical document, by computer scanning of a human- or machine-readable code, or by other means of intake, and subsequently, via non-human validation by comparing the acquired identifying information and confirmation number to examples, against parameters, or by some other formula, to determine whether the information meets criteria for validity established for the purpose.

In various embodiments, issuance of the receipt could be accomplished, for example, without limitation, by, human production of a physical document, by computer production of a physical document, or by computer production of an electronic document, and in the case of a physical document, delivered manually by a human, or automatically by a computer output device such as a computer printer, etc., or, in the case of an electronic document, delivered electronically such as by email, SMS, via login to a website, on a flash memory device, etc.

Although the examinee, an untrusted agent, is responsible for recording the confirmation code on paper form, safeguards protect the process. If the examinee records a code that does not match the code embedded in the exam, the exam can be invalidated, although this may be determined to be a false positive if the document was collected successfully through the standard procedure at the end of the normal exam time. If the examinee attempts to record a code and then hope to create a document later with that code, they cannot anticipate which code the software will embed. If the examinee accurately reports the code then attempts to substitute a document written later, again, they cannot anticipate which code the software will embed in the later document.

To say it another way, the present teachings contemplate and address a plurality of significant risks from means that an examinee, or any other user of the system, or a person operating on behalf of such, could employ to attempt to bypass event security, including, but not limited to one, a combination, and/or all of the following:

A. An examinee could properly submit the identifying information and confirmation number at the end of the event, but then attempt to submit a document other than the one created at the event. In various embodiments, this is the primary risk addressed and to be prevented by the present teachings. The risk is resolved, for example, by the fact the identifying information and confirmation number encrypted in the document are compared after the event to those reported at the event, and mismatching information is dispositive.

B. It is contemplated the examinee may accidentally transpose characters in the identifying information and/or confirmation number when manually recording it. The examiner can undertake reasonable review to decide whether the explanation is plausible, considering the length, character makeup, or other format of the identifying information and confirmation number will be designed to accommodate such a situation while retaining the effectiveness of the method.

C. An examinee could claim the document was submitted timely but the event authority lost it. The risk is the examinee could attempt to submit a document created after the event. The risk is resolved, for example, by the fact that so long as the identifying information and confirmation number were properly captured during the authorized time period, the information inside the encrypted document must match, since the chance of separately creating a new data file with the correct information has been reasonably eliminated.

D. An examinee could claim the identifying information and confirmation number were submitted but the event authority lost the information. The risk is the same as above, which is that the examinee could attempt to submit a file created after the event. The risk is resolved, for example, by the fact that a receipt is provided, such that if the examinee cannot present the receipt, no relief can be permitted.

Figure 3:
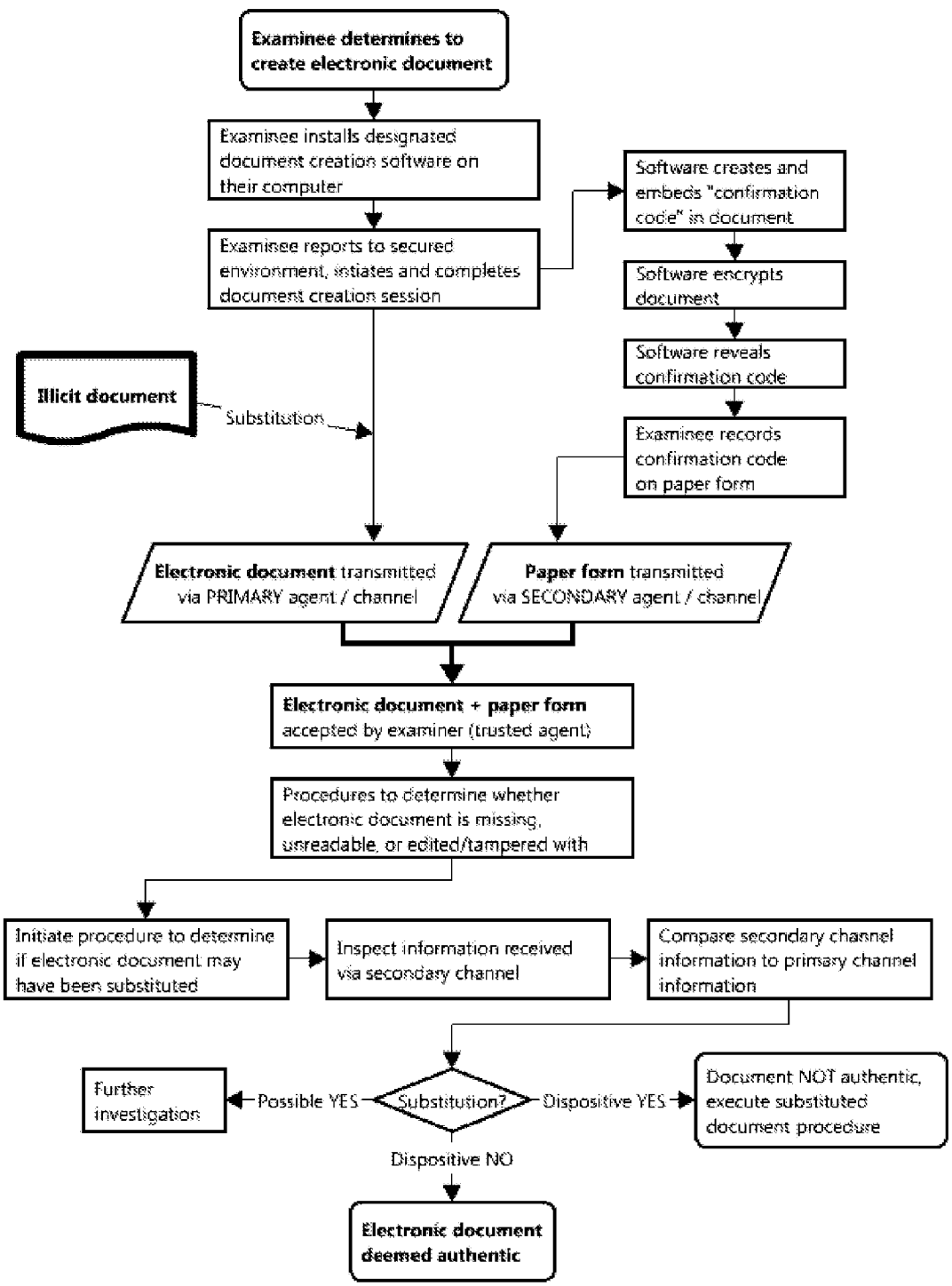
FIG. 3 depicts, in flow chart format, a method for detecting substitution of electronic documents, according to various embodiments of the present teachings.

Once the information form is collected, it is usually processed by the examiner's agents by transcribing the notations into electronic format, which can then be readily compared with the corresponding information in the exam files using tools provided as part of the exam software system. Mismatched information is flagged for further review, and those exams are investigated using methods not part of this application. Matching information assures the examiner the document collected via the primary channel is valid and could only have been created in the secured environment. FIG. 3 depicts, in flow chart format, a method for detecting substitution of electronic documents, according to various embodiments of the present teachings.

While the principles of the present teachings have been illustrated in relation to various exemplary embodiments shown and described herein, the principles of the present teachings are not limited thereto and include any modifications, alternatives, variations and/or equivalents thereof.

What is claimed is:

1. A method for detecting substitution of information by an untrusted agent, comprising:
   (i) providing secured electronic document creation software for use by an untrusted agent for creating informational content within a primary information carrier during a controlled time period and in a controlled location;
   (ii) during use of the software by the untrusted agent:
      a) blocking access to other materials and applications on a computer on which the software is running;
      (b) monitoring operations and actions performed on the computer; and
      (c) logging computer activity and time data;
   (iii) embedding identifying information created by the software into the primary information carrier; wherein the identifying information is random such that there is no unique one-to-one relationship between the identifying information and the primary information carrier;
   (iv) protecting the informational content and identifying information within the primary information carrier by encryption;
   (v) preventing editing of the informational content within the primary information carrier after the controlled time period and outside the controlled location;
   (vi) reporting the identifying information to the untrusted agent at the end of the controlled time period, with a direction to the untrusted agent to record the identifying information to a secondary information carrier;
   (vii) delivering the primary information carrier, by the untrusted agent via a primary information channel, to an authority, and delivering the secondary information carrier, by the untrusted agent via a secondary information channel to the authority;
   (viii) flagging the primary information carrier if it was written over a period at variance with an expected period; wherein said flagging comprises:
      (a) comparing one or more results from the monitoring and logging steps against one or more specified thresholds defining expectations;
      (b) determining if the compared results fall outside such defined expectations; and
      (c) if the compared results are determined to fall outside such defined expectations, flagging the primary information carrier;
   (ix) decrypting at least the identifying information within the primary information carrier;
   (x) comparing the identifying information contained in the secondary information carrier with the corresponding identifying information embedded in the primary information carrier; and,
   (xi) using the results of the comparing step to determine whether substitution of the primary information carrier occurred.

2. The method of claim 1, wherein said primary information carrier comprises an electronic document.

3. The method of claim 2, wherein said electronic document comprises an examination.

4. The method of claim 3, wherein said untrusted agent comprises an examinee.

5. The method of claim 3, wherein said authority comprises an examiner.

6. The method of claim 3, wherein said secondary information carrier comprises a paper form.

7. The method of claim 1, wherein the identifying information contained in the secondary information carrier and the identifying information embedded in the primary information carrier each comprises a string of alphanumeric characters.

8. A method for detecting substitution of information by an untrusted agent, comprising:
provinging secured electronic document creation software for use by an untrusted agent for creating informational content within a primary information carrier during a controlled time period and in a controlled location;
during use of the software by the untrusted agent:
blocking access to other materials and applications on a computer on which the software is running;
monitoring operations and actions performed on the computer; and
logging computer activity and time data;
a step for embedding identifying information created by the software into the primary information carrier; wherein the identifying information is random such that there is no unique one-to-one relationship between the identifying information and the primary information carrier;
a step for protecting the informational content and identifying information within the primary information carrier by encryption;
a step for preventing editing of the informational content within the primary information carrier after the controlled time period and outside the controlled location;
a step for reporting the identifying information to the untrusted agent at the end of the controlled time period, with a direction to the untrusted agent to record the identifying information to a secondary information carrier;
a step for delivering the primary information carrier, by the untrusted agent via a primary information channel, to an authority, and delivering the secondary information carrier, by the untrusted agent via a secondary information channel to the authority;
a step for flagging the primary information carrier if it was written over a period at variance with an expected period; wherein said flagging comprises:
comparing one or more results from the monitoring and logging steps against one or more specified thresholds defining expectations;
determining if the compared results fall outside such defined expectations; and
if the compared results are determined to fall outside such defined expectations, flagging the primary information carrier;
a step for decrypting at least the identifying information within the primary information carrier; and
a step for comparing the identifying information contained in the secondary information carrier with the corresponding identifying information embedded in the primary information carrier;
whereby the results of the comparing step are used to determine whether substitution of the primary information carrier occurred.

9. The method of claim 8, wherein said primary information carrier comprises an electronic document.

10. The method of claim 9, wherein said electronic document comprises an examination.

11. The method of claim 10, wherein said untrusted agent comprises an examinee.

12. The method of claim 10, wherein said authority comprises an examiner.

13. The method of claim 10, wherein said secondary information carrier comprises a paper form.

14. The method of claim 13, wherein said paper form comprises at least one perforation.

15. The method of claim 8, wherein the identifying information contained in the secondary information carrier and the identifying information embedded in the primary information carrier each comprises a string of alphanumeric characters.

16. The method of claim 1, further comprising issuing a receipt to the untrusted agent.

* * * * *